(12) United States Patent
Yu et al.

(10) Patent No.: US 10,170,791 B2
(45) Date of Patent: Jan. 1, 2019

(54) HIGH-VOLTAGE LITHIUM SECONDARY BATTERY

(71) Applicant: LG Chem, Ltd., Seoul (KR)

(72) Inventors: Sung Hoon Yu, Daejeon (KR); Doo Kyung Yang, Daejeon (KR); Sun Sik Shin, Daejeon (KR); Song Taek Oh, Daejeon (KR); Yoo Sun Kang, Daejeon (KR); Kyung Mi Lee, Daejeon (KR); Jin Hyun Park, Daejeon (KR); Jung Don Suk, Daejeon (KR)

(73) Assignee: LG Chem, Ltd. (KR)

( * ) Notice: Subject to any disclaimer, the term of this patent is extended or adjusted under 35 U.S.C. 154(b) by 320 days.

(21) Appl. No.: 14/245,328

(22) Filed: Apr. 4, 2014

(65) Prior Publication Data
US 2014/0220451 A1    Aug. 7, 2014

Related U.S. Application Data

(63) Continuation of application No. PCT/KR2014/000796, filed on Jan. 28, 2014.

(30) Foreign Application Priority Data

Jan. 28, 2013   (KR) .......................... 10-2013-0009336
Jan. 27, 2014   (KR) .......................... 10-2014-0009646

(51) Int. Cl.
*H01M 10/0565*   (2010.01)
*H01M 10/052*    (2010.01)
(Continued)

(52) U.S. Cl.
CPC ..... *H01M 10/0565* (2013.01); *H01M 10/052* (2013.01); *H01M 10/058* (2013.01);
(Continued)

(58) Field of Classification Search
CPC .......... H01M 10/0565; H01M 10/052; H01M 10/058; H01M 4/505; H01M 4/5825; H01M 10/0525

See application file for complete search history.

(56) References Cited

U.S. PATENT DOCUMENTS 5,925,283 A * 7/1999 Taniuchi ................ H01B 1/122
                                                    252/62.2
6,280,882 B1 * 8/2001 Vallee ................. H01M 2/1673
                                                    252/62.2

(Continued)

FOREIGN PATENT DOCUMENTS

CN          1601803 A     3/2005
CN        101188282 A     5/2008

(Continued)

OTHER PUBLICATIONS

Office Action from corresponding European Application No. 14728800.5, dated Jul. 28, 2015.

(Continued)

*Primary Examiner* — Helen Oi K Conley
(74) *Attorney, Agent, or Firm* — Lerner, David, Littenberg, Krumholz & Mentlik, LLP

(57) ABSTRACT

Provided are a lithium secondary battery including a cathode, an anode, a separator, and a gel polymer electrolyte, wherein the gel polymer electrolyte includes an acrylate-based polymer and a charge voltage of the battery is in a range of 4.3 V to 5.0 V, and a method of preparing the lithium secondary battery. A high-voltage lithium secondary battery of the present invention has excellent capacity characteristics at a high voltage of 4.3 V or more.

8 Claims, 1 Drawing Sheet

(51) Int. Cl.
*H01M 10/058* (2010.01)
*H01M 4/505* (2010.01)
*H01M 4/58* (2010.01)
*H01M 10/0525* (2010.01)

(52) U.S. Cl.
CPC .......... *H01M 4/505* (2013.01); *H01M 4/5825* (2013.01); *H01M 10/0525* (2013.01); *H01M 2300/0085* (2013.01); *Y02T 10/7011* (2013.01); *Y10T 29/49115* (2015.01)

(56) References Cited

U.S. PATENT DOCUMENTS

| | | | |
|---|---|---|---|
| 2003/0104282 A1 | 6/2003 | Xing et al. | |
| 2004/0234865 A1 | 11/2004 | Sato et al. | |
| 2005/0084764 A1 | 4/2005 | Lee et al. | |
| 2007/0224504 A1 | 9/2007 | Kita et al. | |
| 2010/0035160 A1 | 2/2010 | Yoon et al. | |
| 2010/0092869 A1* | 4/2010 | Kaneko | H01M 4/362 429/303 |
| 2010/0248038 A1* | 9/2010 | Takami | H01M 4/364 429/332 |
| 2011/0195314 A1* | 8/2011 | Yu | H01M 2/1653 429/303 |
| 2011/0256456 A1 | 10/2011 | Jeon et al. | |
| 2011/0274981 A1* | 11/2011 | Yamada | H01M 4/13 429/303 |
| 2012/0077092 A1 | 3/2012 | Lee et al. | |
| 2012/0156560 A1* | 6/2012 | Hong | H01M 4/364 429/211 |
| 2015/0227150 A1 | 8/2015 | Chamarti et al. | |
| 2016/0028113 A1 | 1/2016 | Jeon et al. | |

FOREIGN PATENT DOCUMENTS

| | | |
|---|---|---|
| CN | 101563808 A | 10/2009 |
| CN | 102544456 A | 7/2012 |
| EP | 2219251 A1 | 8/2010 |
| EP | 2782182 A1 | 9/2014 |
| EP | 2790260 A1 | 10/2014 |
| JP | 2000188129 A | 7/2000 |
| JP | 2002158008 A | 5/2002 |
| JP | 2003068137 A | 3/2003 |
| JP | 2007039266 A | 2/2007 |
| JP | 2010-514134 A | 4/2010 |
| JP | 2011530782 A | 12/2011 |
| KR | 100400215 B1 | 9/2003 |
| KR | 20040011098 A | 2/2004 |
| KR | 20040037154 A | 5/2004 |
| KR | 20080027728 A | 3/2008 |
| KR | 2010-0099994 A | 9/2010 |
| KR | 20120031738 A | 4/2012 |
| WO | 2008/038930 A1 | 4/2008 |
| WO | 2008/075867 A1 | 6/2008 |

OTHER PUBLICATIONS

International Search Report from PCT/KR2014/000796, dated May 12, 2014.

Cho, et al., "Corrosion/passivation of aluminum current collector in bis(flurosulfonyl) imide-based ionic liquid for lithium-ion batteries." Electrochemistry Communications, vol. 22, 2012, pp. 1-3.

Second Office Action from Chinese Application No. 201480001219.1, dated Sep. 5, 2016.

* cited by examiner

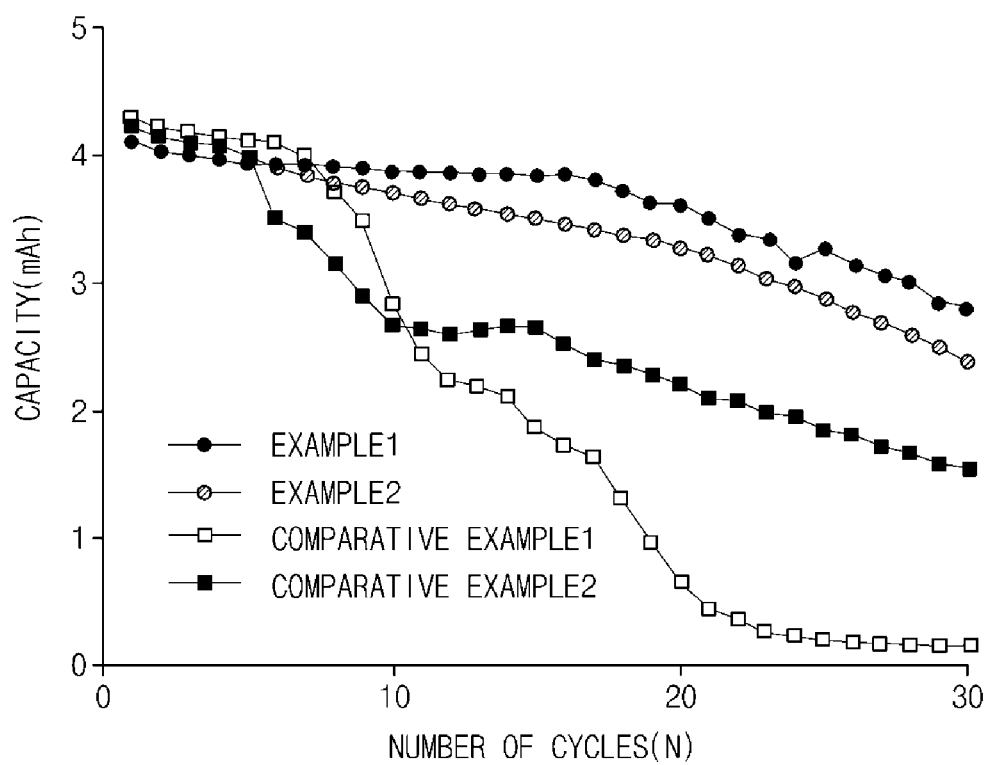

HIGH-VOLTAGE LITHIUM SECONDARY BATTERY

CROSS-REFERENCE TO RELATED APPLICATIONS

This application is a continuation of International Application No. PCT/KR2014/000796, filed Jan. 28, 2014, which claims the benefit of Korean Patent Application Nos. 10-2014-0009646, filed Jan. 27, 2014 and 10-2013-0009336, filed on Jan. 28, 2013, the disclosures of which are incorporated herein by reference.

TECHNICAL FIELD

The present invention relates to a high-voltage lithium secondary battery, and more particularly, to a high-voltage lithium secondary battery which includes a gel polymer electrolyte including a monomer having 2 to 6 acrylate groups and has a charge voltage of 4.3 V to 5.0 V.

BACKGROUND ART

Recently, in line with portable, miniaturization, lightweight, and high-performance trends in electronic devices, electronics, information and telecommunications industries have rapidly grown. Accordingly, high-performance lithium secondary batteries are being used as power sources of these portable electronic devices, and the demand therefor is being rapidly increased. Secondary batteries, which can be repeatedly used by being charged and discharged, are essential for power sources of portable electronic devices for information and telecommunication, electric bikes, or electric vehicles.

In particular, since the performance of these products may depend on batteries as a key component, customer demand for high-capacity batteries is being increased. It is a trend that the development of a high-voltage battery system is performed according to the increase in the capacities of the batteries.

With respect to a typical lithium secondary battery, charge has been performed at a charge voltage of 3.0 V to 4.2 V. Thus, research into obtaining higher energy capacity is performed by using a charge voltage (4.3 V to 5.0 V) higher than the above voltage.

However, in a case where a non-aqueous carbonate-based solvent is used as an electrolyte solution together with an anode and a cathode which are typically used, since oxidizing power may be increased when charge is performed at a voltage higher than a typical charge potential of 4.2 V, the anode and the cathode may deteriorate and a decomposition reaction of the electrolyte solution proceeds as charge and discharge cycles are performed. Thus, lifetime characteristics may be rapidly decreased.

With respect to $LiCoO_2$ as a typical cathode active material, since thermal and electrochemical properties thereof may be inappropriate when used at a high voltage, there is a need to improve the above limitations.

DISCLOSURE OF THE INVENTION

Technical Problem

The present invention provides a high-voltage lithium secondary battery having excellent lifetime characteristics and capacity characteristics at a high voltage of 4.3 V to 5.0 V.

Technical Solution

According to an aspect of the present invention, there is provided a lithium secondary battery including a cathode; an anode; a separator; and a gel polymer electrolyte, wherein the gel polymer electrolyte includes an acrylate-based polymer, and a charge voltage of the battery is in a range of 4.3 V to 5.0 V.

According to another aspect of the present invention, there is provided a method of preparing a lithium secondary battery including inserting an electrode assembly including a cathode, an anode, and a separator disposed between the cathode and the anode into a battery case; and injecting a composition for a gel polymer electrolyte into the battery case and polymerizing the composition to form a gel polymer electrolyte, wherein the composition for a gel polymer electrolyte includes an electrolyte solution solvent; an ionizable lithium salt; and a monomer having 2 to 6 acrylate groups.

Advantageous Effects

A lithium secondary battery according to an embodiment of the present invention has excellent lifetime characteristics and capacity characteristics even in the case in which it is charged at a high voltage of 4.3 V or more.

BRIEF DESCRIPTION OF THE DRAWINGS

FIG. 1 is a graph illustrating capacities of lithium secondary batteries prepared in Examples 1 and 2 and Comparative Examples 1 and 2 when the batteries are charged at a high voltage of 4.3 V.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A lithium secondary battery according to an embodiment of the present invention is a high-voltage lithium secondary battery including a cathode; an anode; a separator; and a gel polymer electrolyte, wherein the gel polymer electrolyte includes an acrylate-based polymer and a charge voltage of the battery is in a range of 4.3 V to 5.0 V.

The gel polymer electrolyte may be formed by polymerizing a composition for a gel polymer electrolyte including an electrolyte solution solvent; an ionizable lithium salt; and a monomer having 2 to 6 acrylate groups.

The monomer having 2 to 6 acrylate groups may be a branched monomer, and for example, may be any one selected from the group consisting of ditrimethylolpropane tetraacrylate, dipentaerythritol pentaacrylate, and dipentaerythritol hexaacrylate, or a mixture of two or more thereof.

The monomer may be included in an amount of 0.1 wt % to 10 wt %, preferably, 0.5 wt % to 5 wt % based on a total weight of the composition for a gel polymer electrolyte.

According to an embodiment of the present invention, the ionizable lithium salt included in the electrolyte, for example, may be any one selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, and $LiC_4BO_8$, or a mixture of two or more thereof. However, the present invention is not limited thereto.

Also, any electrolyte solution solvent typically used in an electrolyte solution for a lithium secondary battery may be used as the electrolyte solution solvent used in the present invention without limitation, and for example, ether, ester, amide, linear carbonate, or cyclic carbonate may be used alone or in a mixture of two or more thereof.

Among these materials, the cyclic carbonate, the linear carbonate, or a carbonate compound as a mixture thereof may be representatively included. Specific examples of the cyclic carbonate may include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and a halide thereof, or a mixture of two or more thereof. Also, as specific examples of the linear carbonate, any one selected from the group consisting of dimethyl carbonate (DMC), diethyl carbonate (DEC), dipropyl carbonate (DPC), ethylmethyl carbonate (EMC), methylpropyl carbonate (MPC), and ethylpropyl carbonate (EPC), or a mixture of two or more thereof may be representatively used. However, the present invention is not limited thereto.

In particular, since propylene carbonate and ethylene carbonate, as cyclic carbonates among the carbonate-based electrolyte solution solvents, are highly viscous organic solvents and have high dielectric constants, the propylene carbonate and ethylene carbonate may well dissociate the lithium salt in the electrolyte solution. Thus, the propylene carbonate and ethylene carbonate may be used. Since an electrolyte solution having high electrical conductivity may be prepared when the above cyclic carbonate is mixed with low viscosity, low dielectric constant linear carbonate, such as ethylmethyl carbonate, diethyl carbonate, and dimethyl carbonate, in an appropriate ratio, the propylene carbonate and ethylene carbonate, for example, may be used.

Also, as the ester among the electrolyte solution solvents, any one selected from the group consisting of methyl acetate, ethyl acetate, propyl acetate, methyl propionate, ethyl propionate, γ-butyrolactone, γ-valerolactone, γ-caprolactone, σ-valerolactone, and ε-caprolactone, or a mixture of two or more thereof may be used. However, the present invention is not limited thereto.

According to an embodiment of the present invention, the composition for a gel polymer electrolyte may further include a polymerization initiator, and a typical polymerization initiator known in the art may be used as the polymerization initiator.

Non-limiting examples of the polymerization initiator may be organic peroxides or hydroperoxides, such as benzoyl peroxide, acetyl peroxide, dilauryl peroxide, di-tert-butyl peroxide, t-butyl peroxy-2-ethyl-hexanoate, cumyl hydroperoxide, and hydrogen peroxide, and azo compounds such as 2,2'-azobis(2-cyanobutane), 2,2'-azobis(methylbutyronitrile), 2,2'-azobis(iso-butyronitrile) (AIBN), and 2,2'-azobis(dimethylvaleronitrile) (AMVN). However, the present invention is not limited thereto.

The polymerization initiator may be dissociated by heat in the battery, for a non-limiting example, at a temperature of 30° C. to 100° C. or may be dissociated at room temperature (5° C. to 30° C.) to form a radical, and may be reacted with the monomer having 2 to 6 acrylate groups by free radical polymerization to form a gel polymer electrolyte.

Also, the polymerization initiator may be used in an amount of 0.01 wt % to 2 wt % based on the total weight of the composition for a gel polymer electrolyte. In the case that the amount of the polymerization initiator used is greater than 2 wt %, the gelation may occur too quickly during the injection of the composition for a gel polymer electrolyte into the battery or the unreacted polymerization initiator may remain to adversely affect the battery performance afterwards. In contrast, in the case in which the amount of the polymerization initiator is less than 0.01 wt %, the gelation may not be well performed.

The electrolyte according to an embodiment of the present invention may selectively include other additives known in the art, in addition to the above-described components.

Also, according to an embodiment of the present invention, the present invention may provide a method of preparing a lithium secondary battery including: inserting an electrode assembly including a cathode, an anode, and a separator disposed between the cathode and the anode into a battery case, and injecting a composition for a gel polymer electrolyte into the battery case and polymerizing the composition to form a gel polymer electrolyte, wherein the composition for a gel polymer electrolyte includes an electrolyte solution solvent; an ionizable lithium salt; and a monomer having 2 to 6 acrylate groups.

According to an embodiment of the present invention, the gel polymer electrolyte may be formed by polymerizing the above-described composition for a gel polymer electrolyte according to a typical method known in the art. For example, the electrolyte may be formed by in-situ polymerization of the composition for a gel polymer electrolyte in the secondary battery.

According to an exemplary embodiment of the present invention, the method may include (a) inserting an electrode assembly formed of a cathode, an anode, and a separator disposed between the cathode and the anode into a battery case, and (b) injecting a composition for a gel polymer electrolyte into the battery case and polymerizing the composition to form a gel polymer electrolyte.

An in-situ polymerization reaction in the lithium secondary battery may be performed by heat polymerization. In this case, polymerization time required may be in a range of about 2 minutes to 12 hours, and heat polymerization temperature may be in a range of 30° C. to 100° C.

When the gelation by the polymerization reaction is completed, a gel polymer electrolyte is formed, and the gel polymer thus formed may be uniformly impregnated with a liquid electrolyte solution, in which an electrolyte salt is dissociated in an electrolyte solution solvent.

An electrode of the lithium secondary battery according to an embodiment of the present invention may be prepared by a typical method known in the art. For example, a binder, a conductive agent, and a dispersant, if necessary, as well as a solvent are mixed with an electrode active material and stirred to prepare a slurry, and a metal current collector is then coated with the slurry and pressed. Thereafter, the electrode may be prepared by drying the metal current collector.

According to an embodiment of the present invention, any compound may be used as a cathode active material included in the cathode without limitation as long as it may be used at a high voltage of 4.3 V to 5.0 V and may reversibly intercalate/deintercalate lithium.

Specifically, the cathode active material may include any one selected from the group consisting of spinel lithium transition metal oxides having a hexagonal layered rock-salt structure with high capacity characteristics, an olivine structure, and a cubic structure, $V_2O_5$, TiS, and MoS, or a composite oxide of two or more thereof.

More specifically, the cathode active material, for example, may include any one selected from the group consisting of compounds of Chemical Formulas 1 to 3, or a mixture of two or more thereof.

$$Li[Li_xNi_aCo_bMn_c]O_2 \quad \text{<Chemical Formula 1>}$$

(where $0<x\leq0.3$, $0.3\leq c\leq 0.7$, $0<a+b<0.5$, and $x+a+b+c=1$);

$$LiMn_{2-x}M_xO_4 \quad \text{<Chemical Formula 2>}$$

(where M is one or more elements selected from the group consisting of nickel (Ni), cobalt (Co), iron (Fe), phosphorus (P), sulfur (S), zirconium (Zr), titanium (Ti), and aluminum (Al), and $0<x\leq 2$);

$$Li_{1+a}Co_xM_{1-x}AX_4 \quad \text{<Chemical Formula 3>}$$

(where M is one or more elements selected from the group consisting of Al, magnesium (Mg), Ni, Co, manganese (Mn), Ti, gallium (Ga), copper (Cu), vanadium (V), niobium (Nb), Zr, cerium (Ce), indium (In), zinc (Zn), and yttrium (Y), X is one or more elements selected from the group consisting of oxygen (O), fluorine (F), and nitrogen (N), A is P, S, or a mixed element thereof, $0\leq a\leq 0.2$, and $0.5\leq x\leq 1$).

The cathode active material may satisfy $0.4\leq c\leq 0.7$ and $0.2\leq a+b<0.5$ in Chemical Formula 1, and may include any one selected from the group consisting of $LiNi_{0.5}Mn_{1.5}O_4$, $LiCoPO_4$, and $LiFePO_4$, or a mixture of two or more thereof.

In the anode according to an embodiment of the present invention, a carbon material, lithium metal, silicon, or tin, which may intercalate and deintercalate lithium ions, may be typically used as an anode active material. For example, the carbon material may be used and both low crystalline carbon and high crystalline carbon may be used as the carbon material. Representative examples of the low crystalline carbon may be soft carbon and hard carbon, and representative examples of the high crystalline carbon may be natural graphite, Kish graphite, pyrolytic carbon, mesophase pitch-based carbon fibers, meso-carbon microbeads, mesophase pitches, and high-temperature sintered carbon such as petroleum or coal tar pitch derived cokes.

A slurry may be prepared by mixing and stirring the anode or the cathode active material, a binder, a solvent, and a conductive agent and a dispersant which may be typically used if necessary. Then, the anode or cathode may be prepared by coating a current collector with the slurry and pressing the coated current collector.

Various types of binder polymers, such as a polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluorine rubber, and various copolymers, may be used as the binder.

Also, a typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Furthermore, a typical porous nonwoven fabric, for example, a nonwoven fabric formed of high melting point glass fibers or polyethylene terephthalate fibers may be used. However, the present invention is not limited thereto.

A shape of the lithium secondary battery according to an embodiment of the present invention is not particularly limited, and for example, a cylindrical type using a can, a prismatic type, a pouch type, or a coin type may be used.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present inventive concept to those skilled in the art.

EXAMPLES

Hereinafter, the present invention will be described in more detail, according to examples and experimental examples. However, the present invention is not limited thereto.

Example 1

<Preparation of Composition for Gel Polymer Electrolyte>

An electrolyte solution was prepared by dissolving $LiPF_6$ in a non-aqueous electrolyte solution solvent having a composition, in which a volume ratio of ethylene carbonate (EC) to ethylmethyl carbonate (EMC) was 1:2, to obtain a $LiPF_6$ concentration of 1 M. A composition for a gel polymer electrolyte was prepared by adding 5 parts by weight of ditrimethylolpropane tetraacrylate and 0.25 parts by weight of t-butylperoxy-2-ethylhexanoate as a polymerization initiator based on 100 parts by weight of the electrolyte solution.

<Preparation of Coin-Type Secondary Battery>

Cathode Preparation

A cathode mixture slurry was prepared by adding 94 wt % of $Li[Li_{0.29}Ni_{0.14}Co_{0.11}Mn_{0.46}]O_2$ as a cathode active material, 3 wt % of carbon black as a conductive agent, and 3 wt % of polyvinylidene fluoride (PVdF) as a binder to N-methyl-2-pyrrolidone (NMP) as a solvent. An about 20 μm thick aluminum (Al) thin film as a cathode current collector was coated with the cathode mixture slurry and dried, and the Al thin film was then roll-pressed to prepare a cathode.

Anode Preparation

An anode mixture slurry was prepared by adding 96 wt % of carbon powder as an anode active material, 3 wt % of PVdF as a binder, and 1 wt % of carbon black as a conductive agent to NMP as a solvent. A 10 μm thick copper (Cu) thin film as an anode current collector was coated with the anode mixture slurry and dried, and the Cu thin film was then roll-pressed to prepare an anode.

Battery Preparation

A battery was assembled using the cathode, the anode, and a separator formed of three layers of polypropylene/polyethylene/polypropylene (PP/PE/PP), and the prepared composition for a gel polymer electrolyte was injected into the assembled battery. Then, a secondary battery was prepared by heating the assembled battery to 80° C. for 2 minutes to 30 minutes in a nitrogen atmosphere.

Example 2

A secondary battery was prepared in the same manner as in Example 1 except that dipentaerythritol pentaacrylate was used instead of ditrimethylolpropane tetraacrylate in the preparation of the composition for a gel polymer electrolyte of Example 1.

Comparative Example 1

A secondary battery was prepared in the same manner as in Example 1 except that ditrimethylolpropane tetraacrylate and t-butylperoxy-2-ethylhexanoate were not used in the preparation of the composition for a gel polymer electrolyte of Example 1.

Comparative Example 2

A secondary battery was prepared in the same manner as in Example 1 except that LiCoO$_2$ was used as a cathode active material in the preparation of the cathode of Example 1.

Experimental Example

The secondary batteries (battery capacity: 4.3 mAh) prepared in Examples 1 and 2 and Comparative Examples 1 and 2 were charged at a constant current of 0.7 C to a voltage of 4.3 V at 55° C. Thereafter, the secondary batteries were charged at a constant voltage of 4.3 V and the charge was terminated when a charge current became 0.215 mA. After the batteries were left standing for 10 minutes, the batteries were discharged at a constant current of 0.5 C to a voltage of 3.0 V. The charge and discharge were repeated for 30 cycles and battery capacities were then measured. The results thereof are presented in FIG. 1.

Specifically, referring to FIG. 1, capacities of Examples 1 and 2 and Comparative Examples 1 and 2 were similar to one another within less than about a 5$^{th}$ cycle. However, the capacities of Comparative Example 1 and 2 were rapidly decreased after about the 5$^{th}$ cycle. In particular, with respect to Comparative Example 2 using LiCoO$_2$ as a cathode active material, the capacity was significantly decreased after the 5$^{th}$ cycle, and the capacity in a 30$^{th}$ cycle was close to 0 mAh. In contrast, Examples 1 and 2 exhibited excellent capacities to the 30$^{th}$ cycle even at a high voltage, and exhibited capacities that were 2 to 4 times or more those of Comparative Examples 1 and 2.

Therefore, it may be understood that the capacities of the batteries prepared in Examples 1 and 2 that were charged at a high voltage of 4.3 V after the 30$^{th}$ cycle were significantly improved in comparison to those of the batteries prepared in Comparative Examples 1 and 2.

INDUSTRIAL APPLICABILITY

Since a lithium secondary battery according to an embodiment of the present invention has excellent lifetime characteristics and capacity characteristics even in the case in which the battery is charged at a high voltage of 4.3 V or more, it may be suitable for secondary batteries.

The invention claimed is:
1. A lithium secondary battery comprising:
a cathode;
an anode;
a separator, wherein the separator is a porous polymer film or a porous nonwoven fabric; and
a gel polymer electrolyte,
wherein the gel polymer electrolyte comprises an acrylate-based polymer,
wherein the cathode comprises a cathode active material consisting of any one selected from the group consisting of compounds of Chemical Formulas 1, 3, LiFePO$_4$ and a mixture of two or more thereof:

  <Chemical Formula 1>

(where 0<x≤0.3, 0.3≤c≤0.7, 0<a+b<0.5, and x+a+b+c=1);

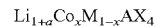  <Chemical Formula 3>

(where M is one or more elements selected from the group consisting of Al, magnesium (Mg), Ni, Co, manganese (Mn), Ti, gallium (Ga), copper (Cu), vanadium (V), niobium (Nb), Zr, cerium (Ce), indium (In), zinc (Zn), and yttrium (Y), X is one or more elements selected from the group consisting of oxygen (O), fluorine (F), and nitrogen (N), A is P, S, or a mixed element thereof, 0≤a≤0.2, and 0.5≤x≤1),
wherein the gel polymer electrolyte is formed by in-situ polymerization in the lithium secondary battery of a composition consisting of an electrolyte solution solvent, an ionizable lithium salt, a polymerization initiator, and a monomer selected from the group consisting of ditrimethylolpropane tetraacrylate, dipentaerythritol pentaacrylate, dipentaerythritol hexaacrylate, and a mixture of two or more thereof, wherein the electrolyte solution solvent is linear carbonate, cyclic carbonate, or a combination thereof, and
wherein the anode comprises an anode active material comprising a carbon material.

2. The lithium secondary battery of claim 1, wherein the cathode active material is any one selected from the group consisting of Chemical Formula 1 where 0.4≤c≤0.7 and 0.2≤a+b<0.5, LiCoPO$_4$, LiFePO$_4$, and a mixture of two or more thereof.

3. The lithium secondary battery of claim 1, wherein the monomer is included in an amount of 0.1 wt % to 10 wt % based on a total weight of the composition.

4. The lithium secondary battery of claim 1, wherein the lithium salt is any one selected from the group consisting of LiPF$_6$, LiBF$_4$, LiSbF$_6$, LiAsF$_6$, LiClO$_4$, LiN(C$_2$F$_5$SO$_2$)$_2$, LiN(CF$_3$SO$_2$)$_2$, CF$_3$SO$_3$Li, LiC(CF$_3$SO$_2$)$_3$, LiC$_4$BO$_8$, and a mixture of two or more thereof.

5. The lithium secondary battery of claim 1, wherein the linear carbonate comprises any one selected from the group consisting of dimethyl carbonate, diethyl carbonate, dipropyl carbonate, ethylmethyl carbonate, methylpropyl carbonate, ethylpropyl carbonate, and a mixture of two or more thereof.

6. The lithium secondary battery of claim 1, wherein the cyclic carbonate comprises any one selected from the group consisting of ethylene carbonate, propylene carbonate, 1,2-butylene carbonate, 2,3-butylene carbonate, 1,2-pentylene carbonate, 2,3-pentylene carbonate, vinylene carbonate, a halide thereof, and a mixture of two or more thereof.

7. A method of preparing a lithium secondary battery of claim 1, the method comprising:
inserting an electrode assembly including a cathode, an anode, and a separator disposed between the cathode and the anode into a battery case, wherein the separator is a porous polymer film or a porous nonwoven fabric; and
injecting a composition for a gel polymer electrolyte into the battery case and polymerizing the composition to form a gel polymer electrolyte,
wherein the composition for a gel polymer electrolyte consists of an electrolyte solution solvent, a polymerization initiator, an ionizable lithium salt, and a monomer selected from the group consisting of ditrimethyl-olpropane tetraacrylate, dipentaerythritol pentaacrylate, dipentaerythritol hexaacrylate, and a mixture of two or more thereof, wherein the cathode comprises a cathode active material which is any one selected from the group consisting of compounds of Chemical Formulas 1, 3, LiFePO$_4$ and a mixture of two or more thereof:

$$Li[Li_xNi_aCo_bMn_c]O_2 \quad \text{<Chemical Formula 1>}$$

(where $0<x\leq0.3$, $0.3\leq c\leq0.7$, $0<a+b<0.5$, and $x+a+b+c=1$);

$$Li_{1+a}Co_xM_{1-x}AX_4 \quad \text{<Chemical Formula 3>}$$

(where M is one or more elements selected from the group consisting of Al, magnesium (Mg), Ni, Co, manganese (Mn), Ti, gallium (Ga), copper (Cu), vanadium (V), niobium (Nb), Zr, cerium (Ce), indium (In), zinc (Zn), and yttrium (Y), X is one or more elements selected from the group consisting of oxygen (O), fluorine (F), and nitrogen (N), A is P, S, or a mixed element thereof, $0\leq a\leq0.2$, and $0.5\leq x\leq1$), and the electrolyte solution solvent is linear carbonate, cyclic carbonate or a combination thereof, and the anode comprises an anode active material comprising a carbon material.

8. The method of claim 7, wherein the polymerization is performed in a temperature range of 30° C. to 100° C.

* * * * *